(12) United States Patent
Onishi

(10) Patent No.: US 8,269,913 B2
(45) Date of Patent: Sep. 18, 2012

(54) LIGHT EMITTING DIODE BACKLIGHT UNIT AND LIQUID CRYSTAL DISPLAY DEVICE HAVING THE SAME

(75) Inventor: Tomohisa Onishi, Gyunggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 206 days.

(21) Appl. No.: 12/696,549

(22) Filed: Jan. 29, 2010

(65) Prior Publication Data

US 2010/0188601 A1    Jul. 29, 2010

(30) Foreign Application Priority Data

Jan. 29, 2009  (KR) .................. 10-2009-0007065

(51) Int. Cl.
*G02F 1/1335* (2006.01)
(52) U.S. Cl. ........................................ 349/61
(58) Field of Classification Search .................. None
See application file for complete search history.

(56) References Cited

U.S. PATENT DOCUMENTS

| | | | | |
|---|---|---|---|---|
| 3,843,267 A * | 10/1974 | Vital et al. | ..................... | 356/225 |
| 5,803,573 A | 9/1998 | Osawa et al. | | |
| 5,842,297 A | 12/1998 | Tung | | |
| 6,175,396 B1 | 1/2001 | Kim et al. | | |
| 7,113,236 B2 * | 9/2006 | Du | .................. | 349/58 |
| 2002/0125815 A1 | 9/2002 | Wakita | | |
| 2006/0023468 A1 | 2/2006 | Takahashi et al. | | |
| 2006/0209564 A1 | 9/2006 | Lin et al. | | |
| 2007/0035842 A1 | 2/2007 | Suh et al. | | |

FOREIGN PATENT DOCUMENTS

| | | |
|---|---|---|
| DE | 297 02 428 U1 | 5/1997 |
| EP | 1 918 768 A2 | 5/2008 |
| JP | 09-090361 | 4/1997 |
| JP | 10-321019 | 12/1998 |
| JP | 2004-233811 | 8/2004 |
| JP | 2005-268142 | 9/2005 |
| WO | WO 2008/051948 A1 | 5/2008 |

OTHER PUBLICATIONS

European Search Report issued in European Patent Application No. EP 10 15 1980, dated May 27, 2010.
Japanese Office Action, and English translation thereof, issued in Japanese Patent Application No. 2010-018106 dated Feb. 28, 2012.

* cited by examiner

*Primary Examiner* — Lucy Chien
(74) *Attorney, Agent, or Firm* — McDermott Will & Emery LLP

(57) ABSTRACT

There is provided a liquid crystal display device using a light guide plate dividing method that clearly establishes a structure for fixing divided light guide plates. An LED backlight unit according to an aspect of the invention may include: a lower cover having a mounting hole therein; a board provided on the lower cover and having a through hole facing the mounting hole of the lower cover; a plurality of LED packages mounted onto the board and supplying light; a light guide plate provided on the lower cover and guiding light supplied from the LED packages; and a fixation unit inserted into the mounting hole and the through hole so that the light guide plate is pressed against the lower cover.

19 Claims, 10 Drawing Sheets

__(1)__

LIGHT EMITTING DIODE BACKLIGHT UNIT AND LIQUID CRYSTAL DISPLAY DEVICE HAVING THE SAME

CROSS-REFERENCE TO RELATED APPLICATIONS

This application claims the priority of Korean Patent Application No. 10-2009-0007065 filed on Jan. 29, 2009, in the Korean Intellectual Property Office, the disclosure of which is incorporated herein by reference.

BACKGROUND OF THE INVENTION

1. Field of the Invention

The present invention relates to an light emitting diode (LED) backlight unit and a liquid crystal display device having the same, and more particularly, to an LED backlight unit that clearly establishes a light guide plate fixing structure in a liquid crystal display using a light guide plate dividing method, and a liquid crystal display having the same.

2. Description of the Related Art

In general, a liquid crystal display (LCD) device displays a desired image on a screen by controlling the amount of transmitted light being supplied from a backlight unit by the use of a liquid crystal panel including a plurality of liquid crystal cells arranged in a matrix format and a plurality of control switches for switching video signals to be supplied to the respective liquid crystal cells.

As for the backlight unit, cold cathode fluorescent lamps (CCFL) or light emitting diodes (LEDs) may be used according to the kind of a light source being used. Recently, light emitting diodes (LEDs), which consume less power, have lower weight and lower luminance than CCFLs, have come to prominence.

Backlight units are categorized into edge type backlight units and direct type backlight units, according to the arrangement of light sources thereof. According to an edge type backlight unit, light sources are arranged along the edges of the backlight unit, and light supplied from the side is guided using light guide plates and is then directed perpendicularly toward the liquid crystal panel. According to a direct type backlight unit, light sources are arranged at the rear of the liquid crystal panel, and light is supplied to the liquid crystal panel without the use of light guide plates.

In the related art, a structure has been proposed in which a screen on which images are displayed is divided and separately driven in order to provide high-quality images to users, and light is selectively supplied from a backlight unit through a divided light guide plate structure.

When an edge type backlight unit and a direct type backlight unit are compared with each other in terms of separate driving, both of them use an LED light source more than CCFLs because of the above-described advantages. In addition, a direct type backlight unit using an LED light source inevitably requires a predetermined distance between a liquid crystal panel and a backlight light source used to generate white light. On the other hand, an edge type backlight unit does not necessarily require a predetermined distance therebetween. As a result, the edge type backlight unit can meet miniaturization requirements.

FIG. 1 is a partial perspective view illustrating a configuration of an edge type local dimming backlight unit according to the related art.

As shown in FIG. 1, the edge type local dimming backlight unit according to the related art includes a lower cover 10 serving as a lower frame, a plurality of light guide plates 20 located on the lower cover 10, a reflective plate (not shown) interposed between the lower cover 10 and the light guide plates 20, LED sources 30 each arranged on the sides of the light guide plates 20 to supply light, and an optical member (not shown) located above the light guide plates 20.

Here, each of the LED light sources 30 includes a circuit board 31 and LED packages 32. The circuit board 31 has conductive lines to which voltage can be applied from an external source. The LED packages 32 are mounted onto the circuit board 31 to thereby supply light in response to the voltage being supplied from the external source.

The circuit board 31 may be disposed perpendicularly to the lower cover 10 having side walls at the edges thereof or may be disposed perpendicularly to the bottom surface of the lower cover 10 between the light guide plates 20, so that light from the LED packages 32 is supplied to the light guide plates 20 arranged at the front surface thereof.

As described above, when the plurality of light guide plates are arranged on the bottom surface of the lower cover, an assembly structure thereof is not definitely provided. Since the light guide plates may move in the case of external shocks, the luminance of specific portions may decrease.

SUMMARY OF THE INVENTION

An aspect of the present invention provides an LED backlight unit that clearly establishes a light guide plate fixing structure in a liquid crystal display using a light guide plate dividing method, and a liquid crystal display device having the same.

According to an aspect of the present invention, there is provided a an LED backlight unit including: a lower cover having a mounting hole therein; a board provided on the lower cover and having a through hole facing the mounting hole of the lower cover; a plurality of LED packages mounted onto the board and supplying light; a light guide plate provided on the lower cover and guiding light supplied from the LED packages; and a fixation unit inserted into the mounting hole and the through hole so that the light guide plate is pressed against the lower cover.

The fixation units may include a head in contact with one edge of the light guide plate, and a body extending from the head and inserted into the through hole of the board.

The fixation unit may include a screw structure formed of a transparent material.

The fixation unit may be formed of the same material as the light guide plate.

The mounting hole of the lower cover may be a groove or a through hole.

The mounting hole of the lower cover and the through hole of the board may have a longitudinal width.

According to another aspect of the present invention, there is provided a liquid crystal display including: a lower cover having a mounting hole therein; a board provided on the lower cover and having a through hole facing the mounting hole of the lower cover; a plurality of LED packages mounted onto the board and supplying light; a light guide plate provided on the lower cover and guiding light supplied from the LED packages; a fixation unit inserted into the mounting hole and the through hole and pressing the light guide plate against the lower cover; and a liquid crystal panel arranged above the light guide plate and receiving light from the LED packages.

The fixation unit may include a head in contact with one edge of the light guide plate, and a body extending from the head and inserted into the through hole of the board.

The fixation unit may include a screw structure formed of a transparent material.

The fixation unit may be formed of the same material as the light guide plate.

The mounting hole of the lower cover may be a groove or a through hole.

The mounting hole of the lower cover and the through hole of the board may have a longitudinal width, and the mounting hole of the lower cover and the through hole of the board each having the longitudinal width may cross each other.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 2:
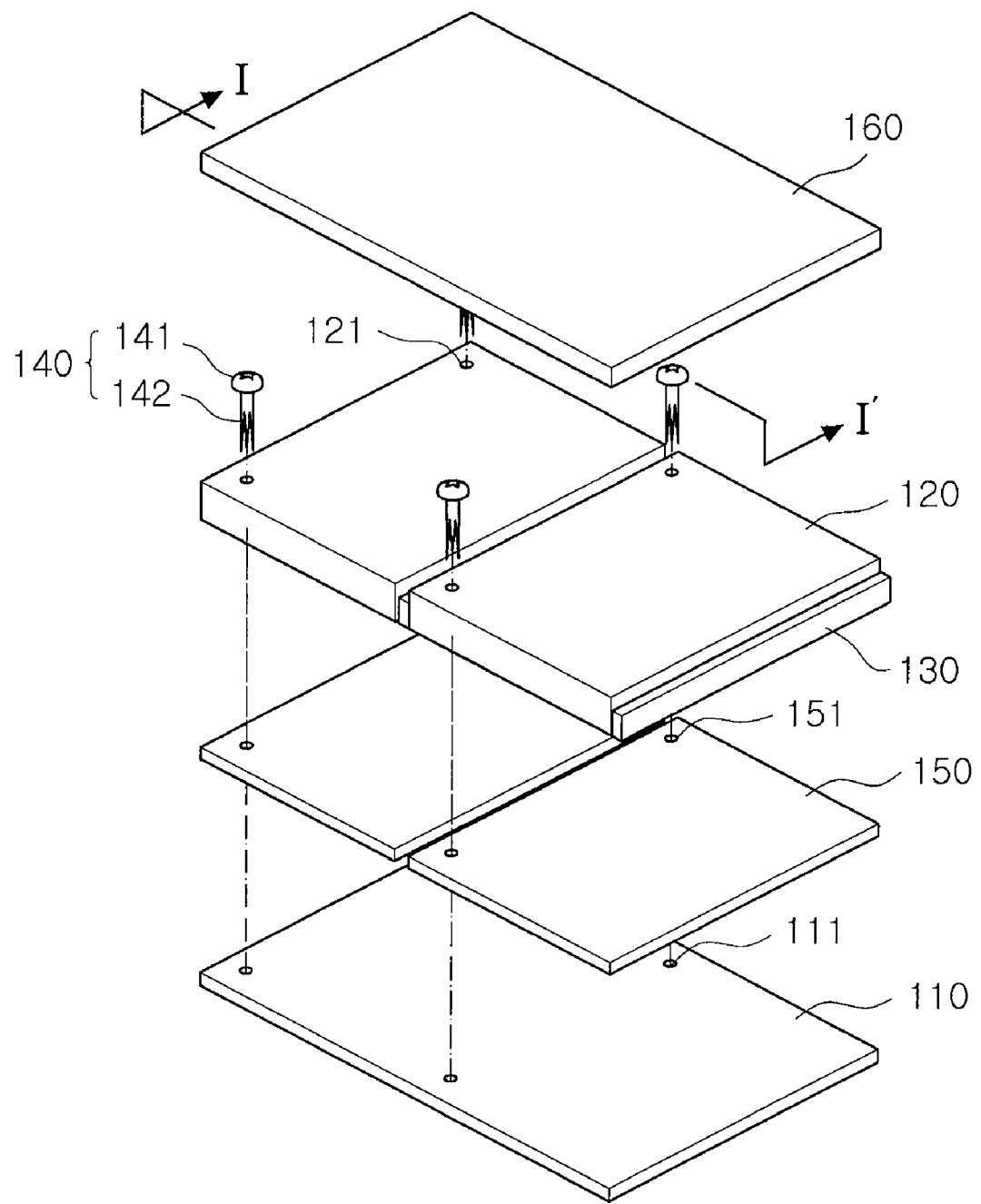
FIG. 2 is an exploded perspective view illustrating a backlight unit according to a first embodiment of the present invention.
Figure 3:
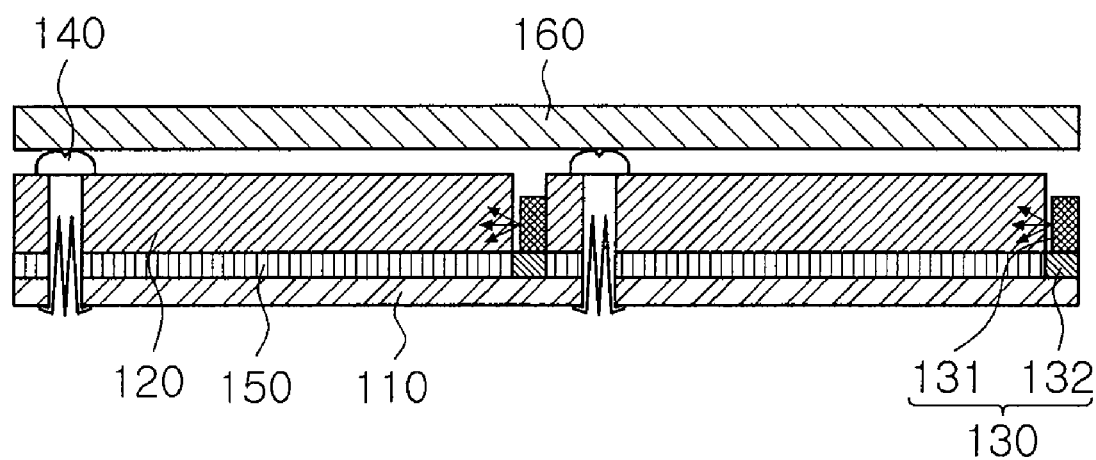
FIG. 3 is a cross-sectional view illustrating the backlight unit, shown in FIG. 2, after lamination, taken along the line I-I'.

FIG. 2 is an exploded perspective view illustrating a backlight unit according to a first embodiment of the invention. FIG. 3 is a cross-sectional view illustrating the backlight unit, shown in FIG. 2, after lamination, taken along the line I-I'. Here, the backlight unit may include a plurality of light guide plates. For convenience of explanation, two light guide plates are shown.

Referring to FIGS. 2 and 3, the backlight unit includes a lower cover 110, light guide plates 120, light source devices 130 and fixation units 140.

The lower cover 110 includes a receiving space. For example, the receiving space may be defined by a plate forming the bottom surface of the lower cover 110 and side walls extending from the edges of the plate.

The lower cover 110 may include mounting slots or mounting portions 111 with which the fixation units 140 to be described below are engaged. Here, the mounting slots or the mounting portions 111 may be through holes or grooves into which the fixation units 140 to be described below are inserted.

The light guide plates 120 are divided into a plurality of light guide plates. The plurality of light guide plates 120 are arranged in parallel with each other within the receiving space of the lower cover 110.

Each of the light guide plates 120 includes the through holes 121 that are bored through a body thereof. The through holes 121 are drilled along the edges of each of the light guide plates 120. However, in the invention, the locations of the through holes 121 and the number of through holes 121 are not limited thereto. The through holes 121 correspond to the mounting portions 111.

In this embodiment, the light guide plates 120 are rectangular. However, the invention is not limited thereto. The light guide plates 120 may have a triangular or hexagonal shape.

The plurality of light source devices 130 are arranged on one side of each of the light guide plates 120 so as to supply light to the light guide plates 120. The light source device 130 may include light sources used to generate light, that is, LED packages 131 and a board 132 having a plurality of circuit patterns to apply a driving voltage to the LED packages 131.

For example, the LED packages 131 may include sub-light emitting diodes that emit blue, green and red light. Here, blue, green and red light emitted from blue, green and red sub-light emitting diodes, respectively, are mixed to generate white light. Alternatively, the light emitting diodes may include a blue light emitting diode and phosphors that convert a portion of blue light emitted from the blue light emitting diode into yellow light. Here, the blue light and the yellow light are mixed to emit white light.

Light generated from the light source devices 130 is incident on the sides of the light guide plates 120, and is emitted upwards by the total internal reflection of the light guide plates 120.

The fixation units 140 secure the light guide plates 120 to the lower cover 110 so as to prevent undesirable movement of the light guide plates 120. The fixation units 140 are inserted into the through holes 121 of the light guide plates 120 so that the light guide plates 120 are secured to the lower cover 110. Further, the fixation units 140 may be inserted into the mounting portions 111 of the light guide plates 120, for example, the through holes or the grooves via the through holes 121 of the light guide plates 120.

Each of the fixation units 140 may include a body 142 and a head 141 extending from the body 142.

The body 142 passes through the through hole of the light guide plate 120 and is engaged with the mounting portion 111. That is, the bodies 142 join the light guide plates 120 and the lower cover 110 together so that the light guide plates 120 are secured to the lower cover 110.

The heads 141, having a greater width than the bodies 142, prevent the fixation units 140 from being completely released from the through holes 121 of the light guide plates 120.

The head 141 may have a semi-circular, semi-elliptical, rectangular or triangular cross-sectional shape. Here, when the head 141 has a triangular cross-section, the contact area between the fixation units 140 and an optical member 160 to be described below can be minimized, thereby preventing the generation of black dots caused by the fixation units 140.

As the light guide plates 120 are separated from the optical member 160 by predetermined intervals, light emitted from the light guide plates 120 can be uniformly supplied to the optical member 160. Here, as the heads 141 support the optical member 160, the heads 141 maintain spacing between the light guide plates 120 and the optical member 160 to be described below. Here, the spacing between the light guide plates 120 and the optical member 160 can be adjusted by controlling the height of the heads 141.

The fixation units 140 may be formed of light-transmissive materials, such as transparent plastic, in order to minimize the effects on image quality.

A reflective member 150 may be disposed under each of the light guide plates 120. The reflective member 150 reflects light emitted downward from the light guide plates 120 and makes the emitted light incident upon the light guide plates 120 again, thereby increasing the luminous efficiency of the backlight unit.

The reflective member 150 may include openings 151 that correspond to the through holes 121 and the mounting portions 111. The fixation units 140 may be engaged with the mounting portions 111 via the through holes 121 and the openings 151. Accordingly, when the reflective members 150 are divided into a plurality of reflective members 150 like the light guide plates 120, the reflective members 150 can both be secured to the lower cover 110 by the fixation units 140.

The backlight unit may further include the optical member 160 that is disposed on the light guide plates 120. An example of the optical member 160 may include a diffusion plate, a diffusion sheet, a prism sheet and a protective sheet that are disposed on the light guide plates 120.

In this embodiment, as the backlight unit has a plurality of divided light guide plates, local dimming using separate driving can be improved.

Furthermore, as the plurality of divided light guide plates are secured to the lower cover using the fixation units, defects caused by the movement of the light guide plates can be prevented.

Further, since the spacing between the light guide plates and the optical member can be constantly maintained by the fixation units, light can be uniformly supplied to the liquid crystal panel.

Figure 4:
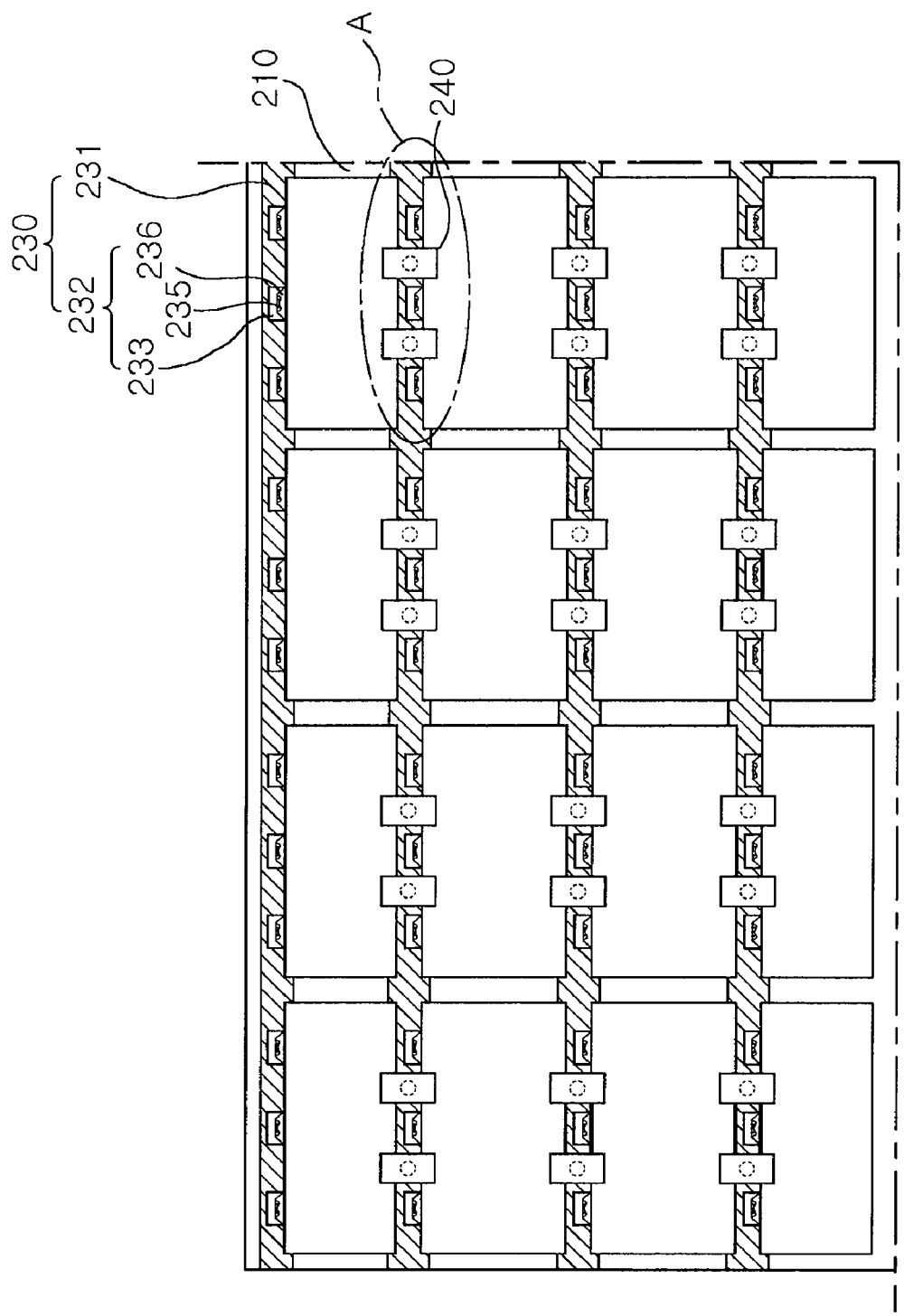
FIG. 4 is a plan view illustrating an LED backlight unit according to a second embodiment of the present invention.
Figure 5:
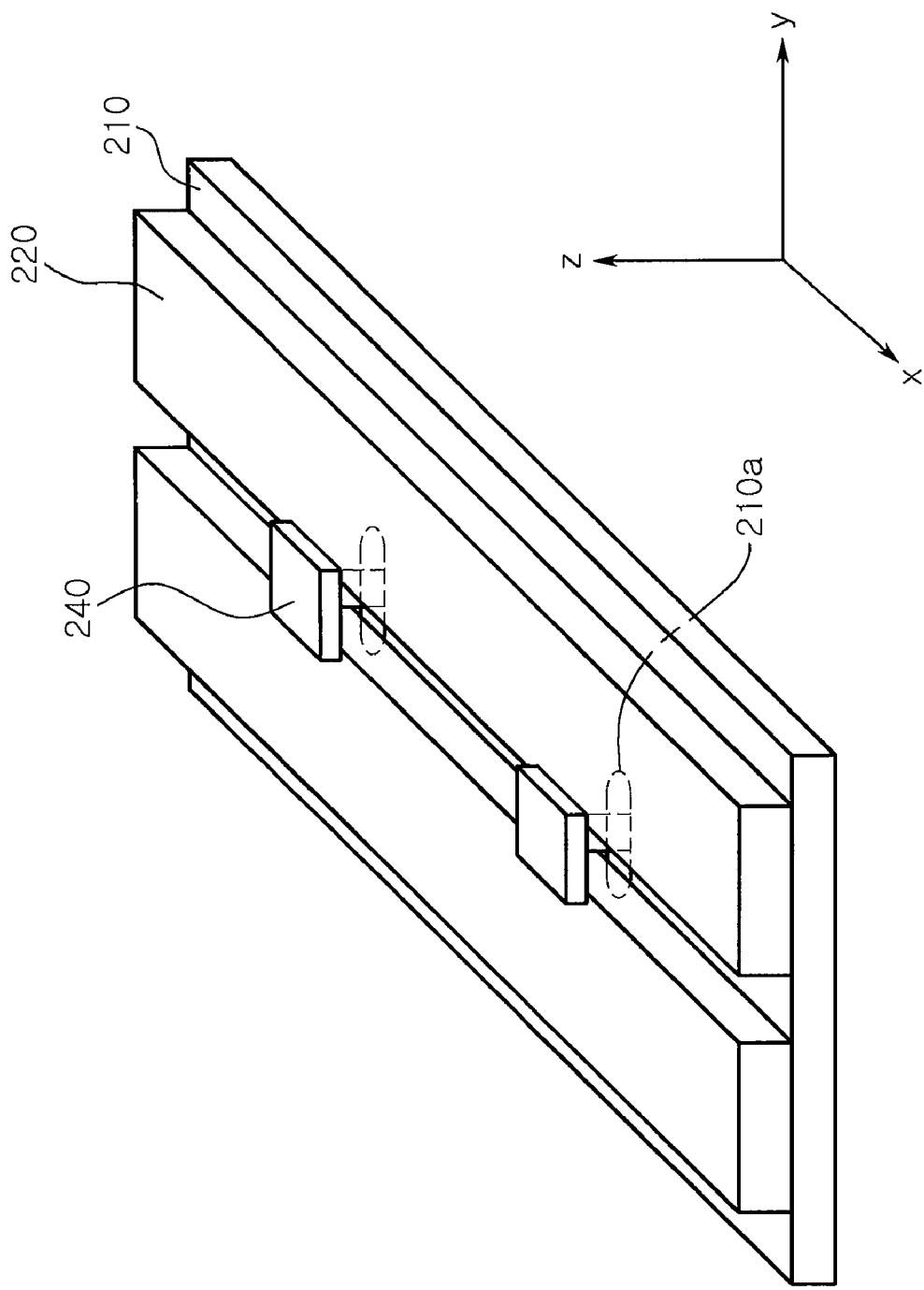
FIG. 5 is a cross-sectional perspective view illustrating a region A of FIG. 4 before the region A is coupled to a board.
Figure 6:
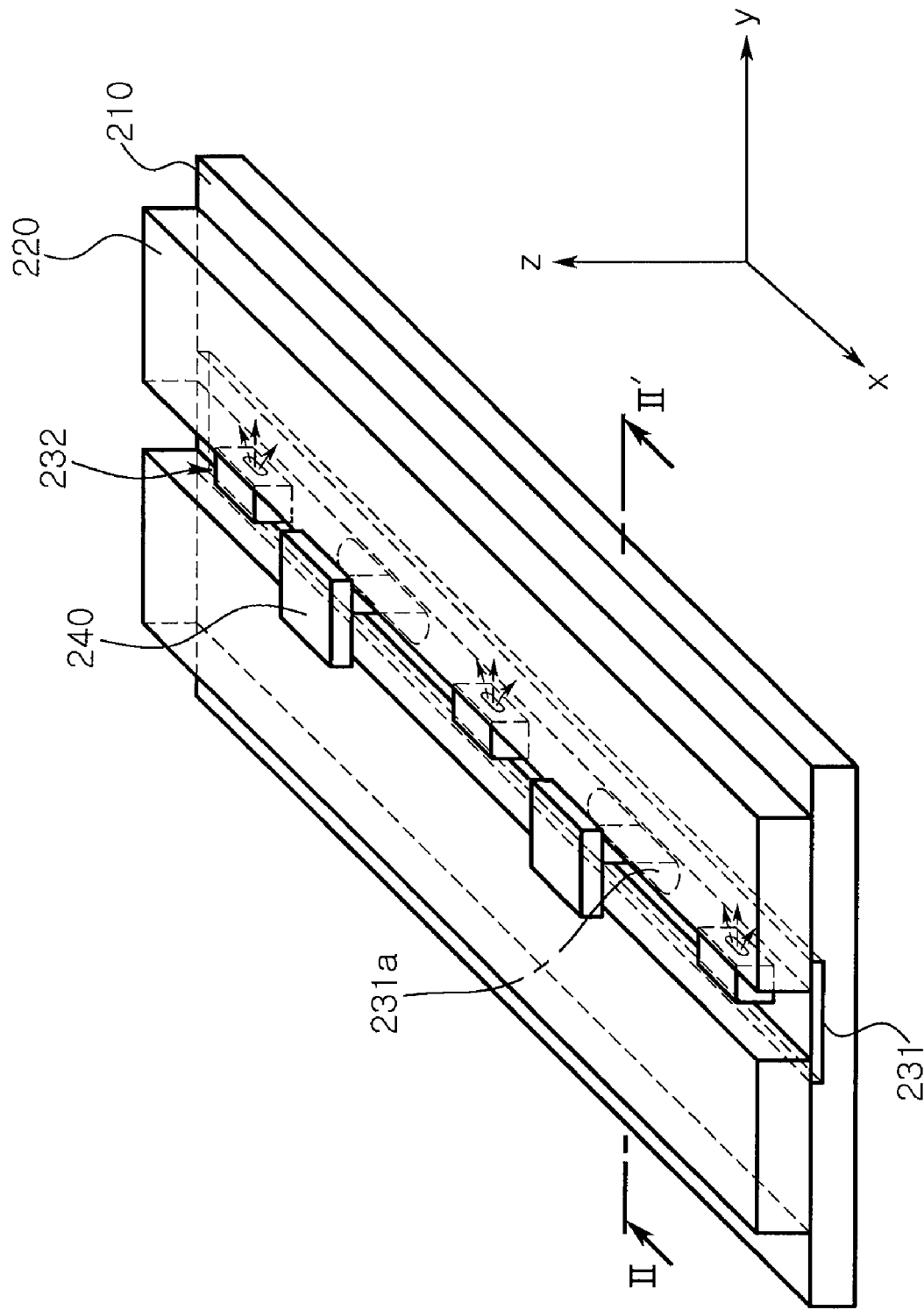
FIG. 6 is a cross-sectional perspective view illustrating the region A of FIG. 4 after the region A is coupled to the board.
Figure 7:
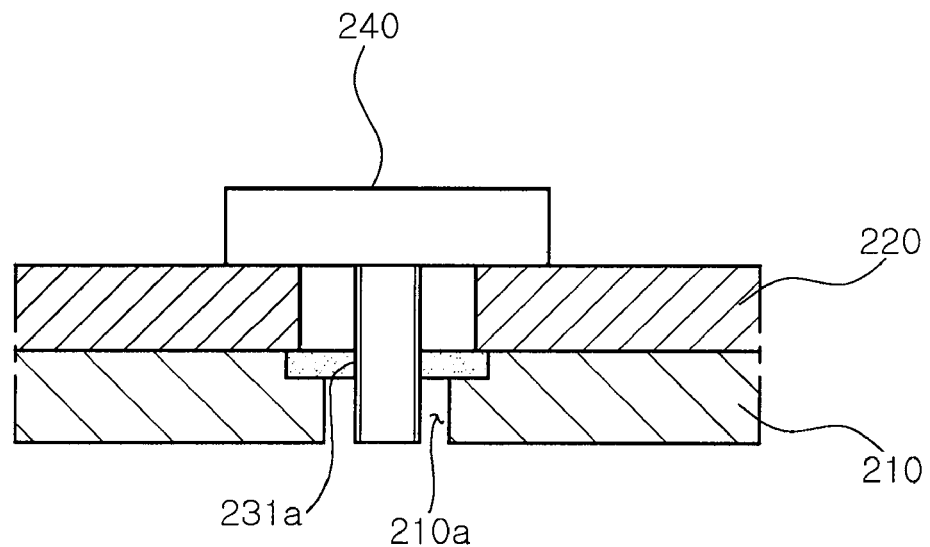
FIG. 7 is a cross-sectional view illustrating the region A taken along the line II-II'.

FIG. 4 is a plan view illustrating an LED backlight unit according to a second embodiment of the invention. FIG. 5 is a cross-sectional perspective view illustrating a region A of FIG. 4 before the region A is coupled to a board. FIG. 6 is a cross-sectional perspective view illustrating the region A of FIG. 4 after the region A is coupled to the board. FIG. 7 is a cross-sectional view illustrating the region A taken along the line II-II'.

As shown in FIGS. 4 through 7, a LED backlight unit according to this embodiment includes a lower cover 210, a plurality of light guide plates 220, boards 231, a plurality of LED packages 232 and fixation units 240. The lower cover 210 includes mounting slots or mounting portions including first through holes 210a or grooves. The plurality of light guide plates 220 are disposed on the lower cover 210. Each of the boards 231 is provided on the side of each of the light guide plates 220, disposed horizontally to the bottom surface of the lower cover 210, has lines to be supplied with voltage from an outer source, and has second through holes 231a corresponding to the first through holes 210a of the lower cover 210. The plurality of LED packages 232 are mounted onto the board 231 provided at the side of each of the light guide plates 220 and supply light. The fixation units 240 are engaged with the second through holes 231a of the board 231 and/or the first through holes 210a of the lower cover 210 to compress one edge of each of the light guide plates 220.

Here, the lower cover 210 has the first through holes 210a in the shape of a circle, a rectangle or an ellipse or ((mounting) grooves recessed into the plate), which are bored through the plate forming the bottom surface and having the receiving space. The lower cover 210 is formed of iron (Fe) or electrolytic galvanized iron (EGI) to form a lower frame. The lower cover 210 may further include side walls extending vertically upward from the edge of the plate forming the bottom surface, that is, lateral frames. Here, the bottom surface of the lower frame may be divided into a plurality of regions arranged in parallel to configure a local dimming backlight unit. Here, grooves may be formed to separate the plurality of regions from each other. The grooves separating the plurality of regions from each other correspond to receiving grooves of the board 231, which are described below.

Further, the first through holes 210a of the lower cover 210 may have various shapes including a circle, an ellipse or a rectangle. The first through hole 210a may have a longitudinal width. Specifically, the first through hole has two long sides in parallel and two short sides connected to the long sides and having predetermined curvatures at both ends of the respective long sides. Here, the first through holes 210a are formed in the lower cover 210 so that the direction of the first through holes 210a are arranged in the same direction as a direction in which light moves. The (mounting) grooves also have the same structural characteristics as described above.

A reflective plate (not shown) may be attached to the entire bottom surface of the lower cover 210 or a plurality of regions of the bottom surface except for receiving grooves when the receiving grooves are formed to receive the boards 231 therein. Each of the reflective plates includes a white polyester film or a film coated with a metal, such as silver (Ag) or aluminum (Al). The reflective plates have a light reflectance within the range of 90 to 97% with respect to visible light. The thicker the coated film is, the higher the reflectance is.

Here, the plurality of reflective plates, provided on the bottom surfaces of the lower cover 210, may be extended and disposed between the LED packages 232 supplying light and the light guide plates 220 located adjacent to the rear surfaces of the LED packages 232. In this case, light supplied and guided by the one side of each of the light guide plates 220 is reflected again by the reflective plates without being interfered with by the LED packages 232 arranged at the other side of each of the light guide plates 220, and then the reflected light is supplied in a direction of an optical member (not shown) located above the light guide plates 220.

An LED light sources 230 is provided within the receiving groove of the lower cover 210 or one side of the light guide plate 220. Here, the LED light source 230 includes a board 231, that is, a PCB, and LED packages 232. The board 231 is provided in the receiving groove of the lower cover 210, is disposed horizontally to the bottom of the lower cover 210, has lines to be supplied with voltage from an external source, and has second through holes 231a corresponding to the first through holes 210a of the lower cover 210. The LED packages 232 are mounted onto the board 231.

Here, the board 231 includes the LED packages 232 and the second through holes 231a that are formed between the LED packages 232. The second through holes 231a formed in the board 231 correspond to (or face) the first through holes 210a of the lower cover 210. The second through holes 231a, formed in the board 231, may be circular or elliptical like the first through holes 210a of the lower cover 210. In this embodiment, the second through hole 231a may be a through hole having a longitudinal width. That is, a through hole has two parallel long sides and short sides connected to the respective long sides and having predetermined curvatures at the ends of the long sides. A longitudinal direction (X-axis) of each of the second through holes 231a is perpendicular to a direction in which light moves. The longitudinal direction (X-axis) of each of the second through holes 231a of the board 231 crosses a longitudinal direction (Y-axis) of each of the first through holes 210a of the lower cover 110.

Here, the size of the second through holes 231a formed in the board 231, and more precisely, an interval (or distance) between the two long sides may have relation to the diameter of the body of the fixation unit 240 having a screw thread thereon. This is because the size of the second through holes 231a can affect the spacing between the LED packages 232 supplying light and the light guide plates 220 guiding the light, supplied from the LED packages 232, incident thereupon. This will be described below in detail.

Each of the LED packages 232 includes a package body 233, an LED chip 235 and a pair of first and second electrode structures (not shown). The package body 233 is secured to the board 231, forms an external frame and has a receiving groove. The LED chip 235 is mounted within the receiving groove of the package body 233 to supply light. The first and second electrode structures (not shown) are exposed to the receiving groove, have the LED chip 235 mounted therein, and are connected to the wires of the board 231.

Here, when the LED chip 235 is a blue light emitting diode chip, the LED package 232 may further include a resin encapsulation unit 236 provided in the receiving groove in order to supply white light. Here, the resin encapsulation unit 236 may include a yellow phosphor. For example, the resin encapsulation unit 236 may be obtained by injecting gel epoxy resins containing a YAG-based yellow phosphor or gel silicon resins containing a YAG-based yellow phosphor into the receiving groove of the package body 233 and then curing the resins by ultraviolet (UV) curing or thermosetting.

The invention, however, is not limited to the LED package 232 that includes the blue light emitting diode chip and the yellow phosphor. The LED package 232 may include a near-UV light chip and a resin encapsulation unit provided in the near-UV chip and having red, green and blue phosphors mixed together or a resin encapsulation unit containing red, green and blue phosphors while the red, green and blue phosphors are sequentially laminated to each other.

The plurality of light guide plates 220 are provided on the bottom surface of the lower cover 210 that is divided into a plurality of regions. Here, the side of the light guide plate 220 may be tightly associated with the package body 233 so that light supplied from the LED chip 235 mounted within the receiving groove of the package body 233 can be introduced into the light guide plate 220 without causing any light loss.

The light guide plate 220 is formed of PMMA. Since PMMA has lower absorption of light in the visible region than any other polymer materials, PMMA has high transparency and high gloss. Furthermore, since PMMA has high mechanical stiffness properties, PMMA is neither broken nor deformed. PMMA is also lightweight and chemically resistant. PMMA has a high visible transmission within the range from 90% to 91%, has low internal loss and excellent mechanical properties, such as tensile strength, flexural strength or elongation.

The fixation units 240 are engaged with the board 231 between one light guide plate 220 and another light guide plate 220. The fixation unit 240 comprises a screw formed of a transparent material. The fixation units 240 are engaged with the board 231 through the second through holes 231a of the board 231 and the first through holes 210a of the lower cover 210 that correspond to the second through holes 231a, so that constant spacing can be maintained between the light guide plates 220, provided on both sides of the LED packages 232, that is, a front side through which light is emitted and a rear side opposite to the front side, and the light guide plates 220 disposed adjacent to each other can be fixed at the same time.

Here, the fixation units 240 may be formed of a transparent material so that light guided by the light guide plates 220 can be supplied to the optical member located above the fixation units 240. Preferably, the fixation units 240 are formed of the same material as the light guide plates 220.

Each of the fixation units 240, according to this embodiment, consists of a head having a circular or square shape, and a body extending from the head and having a cylindrical shape. A thread formed on the outside of the body of each of the fixation units 240 may be screwed into the second through holes 231a of the board 231 or the first through holes 210a of the lower cover 210. Alternatively, the body of the fixation unit 240 may have the shape of a square pillar.

Here, the size of the head is designed to cover the spacing between one light guide plate 220 and another light guide plate 220 and partially cover one edge of each of the light guide plates 220. Therefore, the size of the head may vary according to the spacing between the light guide plates 220. The diameter of the body may be equal to an interval or a distance between two long parallel sides of the second through holes 231a of the board 231 and/or the first through holes 210a of the lower cover 210.

The size of the head or the diameter of the body of the fixation units 240 may vary slightly according to the size of the second through holes 231a of the board 231 as described above. For example, when the second through hole 231a of the board 231 is small, the diameter of the body of the fixation unit 240 is reduced. As a result, the interval between the LED packages 232 and the light guide plate 220 may be reduced.

When the fixation units 240 are connected by a screw engagement to the board 231 and/or the lower cover 210, the upper edges of the light guide plates 220 disposed adjacent to the board 231 to which the LED packages 232 are fixed are pressed by the heads of the fixation units 240. As a result, the movement of the light guide plates 220 can be protected against external forces.

Nuts may be fit around portions of the fixation units 240 that pass through the first through holes 210a of the lower cover 210 to be exposed to the outside, thereby increasing the strength.

As a result, the fixation units 240, engaged with the board 231, can serve as spacers between the LED packages 232 and the light guide plates 220, thereby maintaining the constant spacing between the LED packages 232 and the light guide plates 220 and further handing the contraction and/or expansion of the light guide plates 220.

Here, a thread is not necessarily formed on the fixation units 240. For example, as shown in FIG. 3, each of the fixation units 240 may be a screw having a hook formed on the end thereof that corresponds to the screw head, as described above. Thus, the fixation units 240 may be inserted through the second through holes 231a of the board 231 and the first through holes 210a of the lower cover 210 and thus be secured to the lower cover 210.

An optical member (not shown) is provided on the plurality of light guide plates 220 in order to improve the optical properties of light supplied through the light guide plates 220. Here, the optical member may include a diffusion plate having a diffusion pattern thereon to reduce the non-uniformity of light transmitted through the light guide plates 220, and a prism sheet having a condensing pattern thereon.

In this configuration, the light guide plates 220 are secured using the fixation units 240 between the light guide plates 220, thereby preventing the movement of the light guide plates 220 against external shocks and handling the contraction of the light guide plates 220 in a direction (X-axis) perpendicular to the direction in which light moves.

The contraction of the board 231 along the longitudinal direction (X-axis) of the second through holes 231a can also be handled by the second through holes 231a of the board 231 that have a longitudinal direction and a traverse direction.

When the light guide plates 220 expand and/or contract, the first through holes 210a of the lower cover 210 having the longitudinal direction (Y-axis), provided along the moving direction of light, and the fixation units 240 inserted into the first through holes 210a, allow the light guide plates 220 and the fixation units 240 and/or the board 231 to move along the longitudinal direction (Y-axis) of the first through holes 210a of the lower cover 210 at the same time. As a result, the constant spacing can be maintained between the light guide plates 220 and the LED packages 232, thereby preventing the generation of bright dots and bright lines greater in amount more than in the related art.

The liquid crystal display device according to this embodiment includes the LED backlight unit according to the first or second embodiment of the invention, and further includes a liquid crystal panel (not shown) provided on the optical member.

Here, the liquid crystal display may further include a mold structure, which is a main support, in order to prevent the distortion of the display device against external forces. A backlight unit is provided under the main support and a liquid crystal panel is loaded on the main support.

The liquid crystal panel has a thin film transistor array substrate and a color filter substrate attached to each other and a liquid crystal layer interposed therebetween.

Signal lines, such as gate lines and data lines, cross each other on the thin film transistor array substrate. Thin film transistors (TFTs) are formed at intersections of the gate lines and the data lines on the thin film transistor array substrate. The TFTs switch video signals, that is, red (R), green (G) and blue (B) data signals to be transmitted to liquid crystal cells of the liquid crystal layer from the data lines in response to scanning signals supplied through the gate lines. Pixel electrodes are formed at pixel regions between the data lines and the gate lines.

A black matrix corresponding to the gate lines and the data lines of the thin film transistor array substrate, color filters provided on regions divided by the black matrix and producing colors of red (R), green (G), and blue (B), and common electrodes formed on the black matrix and the color filters are situated on the color filter substrate.

Data pads extending from the data lines and gate pads extending from the gate lines are formed along the edges of the thin film transistor array substrate to which the color filter substrate is attached. A gate driving unit and a data driving unit connected to the data pads and the gate pads, respectively, are provided to supply signals thereto.

An upper cover may be provided on the liquid crystal panel to cover the four edges of the liquid crystal panel and fixed to the side walls of the main support or the lower cover 210 at the same time. The upper cover is also formed of the same material as the lower cover 210.

Hereinafter, various examples of an LED package that is employed in exemplary embodiments of the invention will be described in detail.

Figure 8:
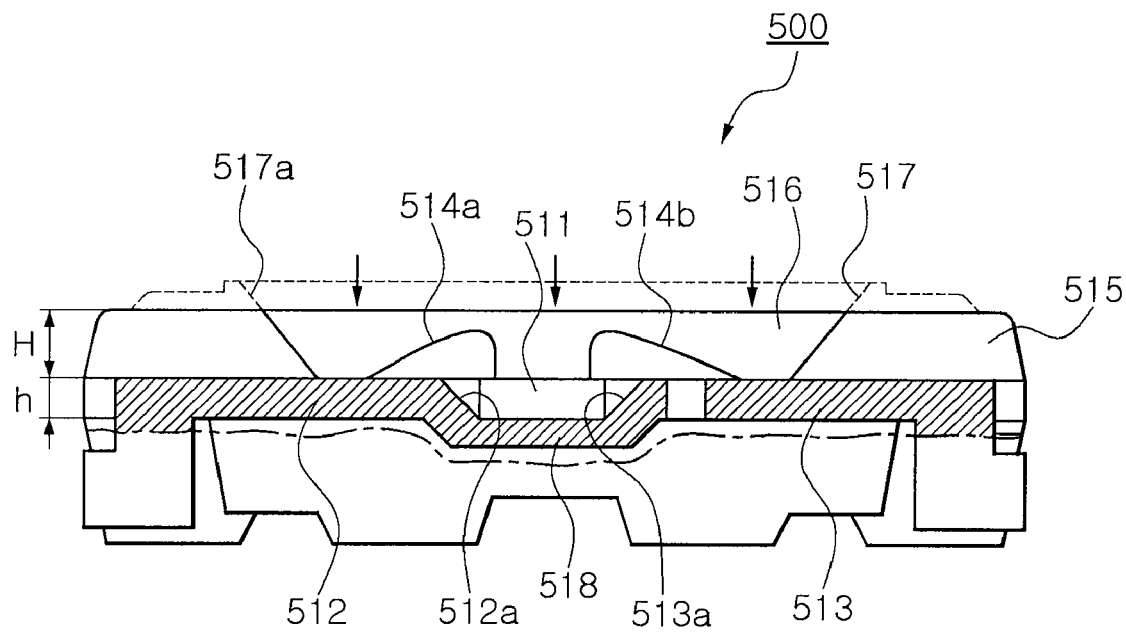
FIG. 8 is a cross-sectional view illustrating an LED package according to an example that is employed in the present invention.

FIG. 8 is a cross-sectional view illustrating an example of an LED package that is employed in an exemplary embodiment of the invention.

As shown in FIG. 8, an LED package 500 according to an example of the invention includes a light emitting diode chip 511, electrode structures 512 and 513, a package body 515, a light-transmissive, transparent resin 516 and a recess 518 having the light emitting diode chip 511 mounted therein.

The light emitting diode chip 511 comprises a light emitting device that generates light when power is applied. The light emitting diode chip 511 has a p-type electrode and an n-type electrode that are provided horizontally on the upper surface of the chip.

A pair of (metallic) wires 514a and 514b have their ends bonded and connected to the light emitting diode chip 511, and the other ends of the pair of wires 514a and 514b bonded and connected to the electrode structures 512 and 513.

The package body 515 is a molded structure obtained using resin materials while forming a cavity 517 that has a closed bottom and an upper opening.

Here, the cavity 517 includes an upper inclined surface that is inclined at a predetermined angle. The upper inclined surface may include reflective members 517a that are formed of a metallic material, such as Al, Ag or Ni, which has a high reflectance to reflect light generated from the light emitting diode chip 511.

The pair of electrode structures 112 and 113 are received and fixed within the package body 515. Portions of the electrode structures 512 and 513 are exposed through the bottom surface of the cavity 517 to the outside.

The other ends of the pair of the electrode structures 512 and 513 are exposed to the outside of the package body 515 so that the electrode structures 512 and 513 can be connected to an external power supply.

The recess 518 may be formed in the electrode structure 512, having the light emitting diode chip 511 mounted therein, between the pair of electrode structures 512 and 513.

Figure 9:
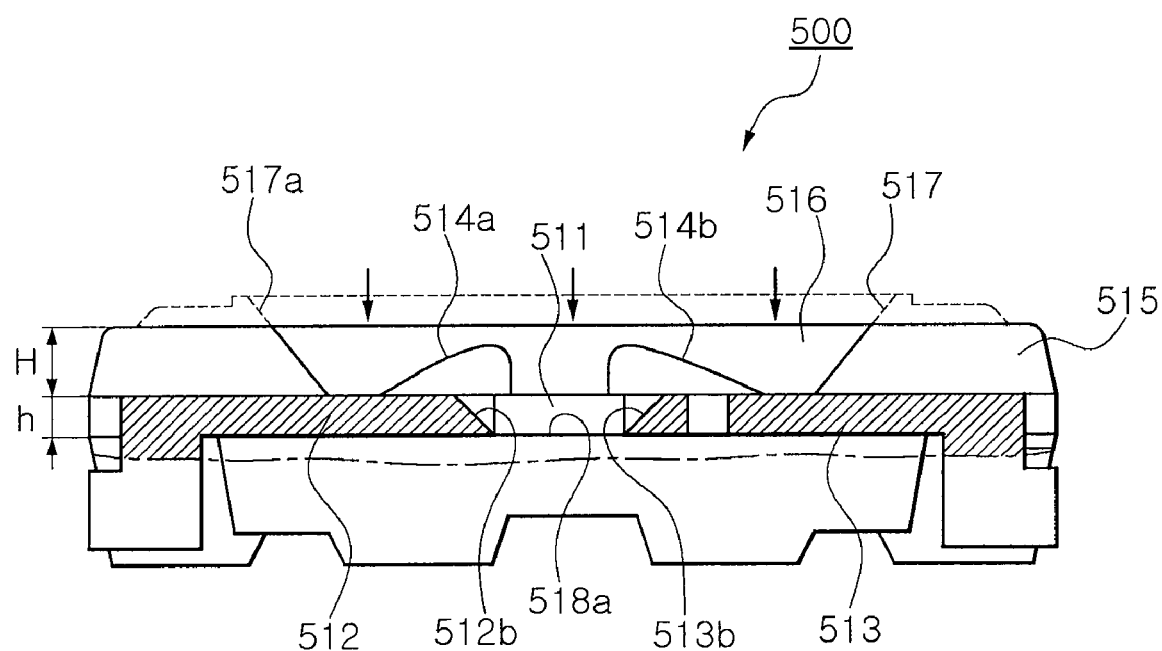
FIG. 9 is a cross-sectional view illustrating an LED package according to another example that is employed in the present invention.

FIG. 9 is a cross-sectional view illustrating an LED package according to another example of the invention.

As shown in FIG. 9, an LED package according to another example of the invention has a recess 518a that is different from the recess 518 of the first embodiment. That is, when the package body 515 is molded, the recess 518a is formed from the bottom of the cavity 517 to a predetermined depth and is disposed between the ends of the pair of electrode structures 512 and 513 facing each other.

Except for the configuration of the recess 518a, the other components are the same as those of the LED package according to one example employed in the invention. Thus, a description thereof will be omitted.

The light-transmissive, transparent resin 516 is formed of a transparent resin material, such as epoxy, silicon or resin, injected into the cavity 517 such that the light-transmissive, transparent resin 516 covers the light emitting diode chip 511 and the wires 514a and 514b to protect them from the external environment.

Here, the light-transmissive, transparent resin 516 may include a fluorescent material for wavelength conversion that can convert light generated from the light emitting diode chip 511 into white light. The fluorescent material may be any one of YAG-based, TAG-based, silicate-based, sulfide-based and nitride-based fluorescent materials.

The YAG-based and TAG-based fluorescent materials may be selected from materials satisfying (Y, Tb, Lu, Sc, La, Gd, Sm)3(Al, Ga, In, Si, Fe)5(O, S)12:Ce. The silicate-based fluorescent material may be selected from materials satisfying (Sr, Ba, Ca, Mg)2SiO4: (Eu, F, Cl). The Sulfide-based fluorescent material may be selected from materials satisfying (Ca,Sr)S:Eu and (Sr,Ca,Ba)(Al,Ga)2S4:Eu. The nitride-based fluorescent material may be selected from materials satisfying (Sr, Ca, Si, Al, O)N:Eu, for example, CaAlSiN4:Eu or β-SiAlON:Eu, or materials satisfying Ca-α SiAlON:Eu-based (Ca$_x$,M$_y$) (Si,Al)12(O,N)16, where M denotes at least one of europium (Eu), terbium (Tb), ytterbium (Yb) and erbium (Er), and x and y meet the conditions of 0.05<(x+y)<0.3, 0.02<x<0.27 and 0.03<y<0.3.

The white light can be obtained using a yellow (Y) phosphor; green (G) and red (R) phosphors; or Y, G and R phosphors in a blue (B) LED chip. The yellow, green and red phosphors are excited by the blue LED chip to thereby emit yellow light, green light and red light, respectively. A portion of blue light emitted from the blue LED chip is mixed with yellow, green and red light to thereby produce white light.

The blue LED chip may employ a group III nitride semiconductor in common use. A substrate formed of the nitride semiconductor may be any one of sapphire, spinel (MgAl204), SiC, Si, ZnO, GaAs and GaN substrates.

The substrate may further include a buffer layer. The buffer layer may be selected from any one of a nitride semiconductor-based material and a carbide-based material.

An n-type nitride semiconductor layer is formed on the buffer layer. The n-type nitride semiconductor layer may include an n-type GaN-based semiconductor layer and an n-type superlattice layer. The n-type nitride semiconductor layer may include an un-doped GaN layer, an n-type GaN contact layer, an n-type GaN layer formed on the n-type GaN contact layer, and an n-type superlattice layer formed on the n-type GaN layer. The n-type superlattice layer may have a multilayer structure of alternating layers of GaN/InGaN-based semiconductor layers, AlGaN/GaN-based semiconductor layers or AlGaN/GaN/InGaN-based semiconductor layers. An n-type GaN-based semiconductor layer may further be included in the n-type GaN-based semiconductor layer.

In addition, the n-type GaN semiconductor layer may have a V-shaped distortion structure in cross-section. The V-shaped distortion structure has a flat growth surface and an inclined growth surface.

Figure 10A:
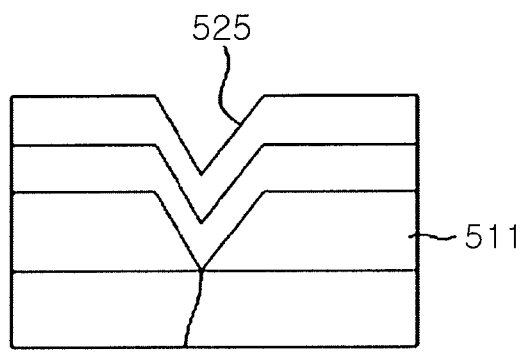
FIG. 10A is a cross-sectional schematic view illustrating a V-shaped distortion structure that is formed on a light emitting diode layer in a light emitting diode chip.
Figure 10B:
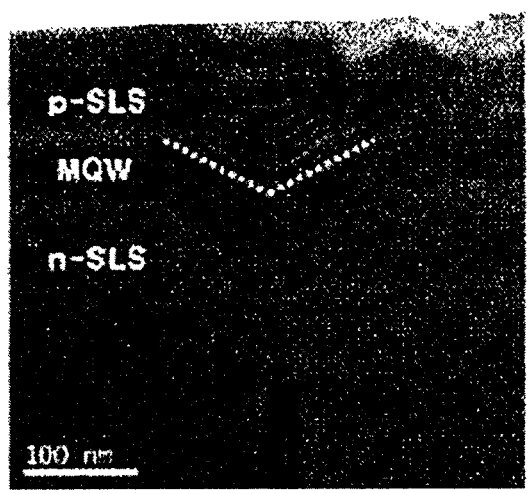
FIG. 10B is an actual cross-sectional picture.
Figure 10C:
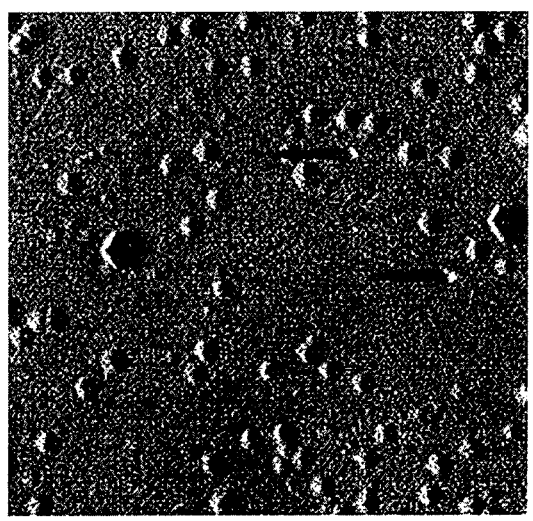
FIG. 10C is a plan picture.

FIGS. 10A, 10B and 10C are views illustrating a V-shaped distortion structure that is formed in a light emitting diode layer in a light emitting diode chip. FIG. 10A is a cross-sectional schematic view, FIG. 10B is an actual cross-sectional picture, and FIG. 10C is a plan picture.

The light emitting diode chip 511 is an n-type nitride semiconductor layer. An active layer is formed on the n-type nitride semiconductor layer, and the active layer may further include at least one quantum well layer. The quantum well layer may be formed of InGaN or GaN. The active layer may further include at least one quantum barrier layer. The quantum barrier layer may be formed of InGaN, GaN or AlGaN. A band gap of the quantum barrier layer is greater than that of the quantum well layer.

A p-type nitride semiconductor layer is formed on the active layer. The p-type nitride semiconductor layer includes a p-type superlattice layer and a p-type GaN-based semiconductor layer. The p-type superlattice layer may have a multilayer structure of alternating layers of GaN/InGaN-based semiconductor layers, AlGaN/GaN-based semiconductor layers or AlGaN/GaN/InGaN-based semiconductor layers. The p-type nitride semiconductor layer may include a p-type superlattice layer, a p-type GaN layer on the p-type superlattice layer, and a p-type GaN contact layer on the p-type GaN layer.

A transparent electrode and a bonding electrode may be further provided on the p-type nitride semiconductor layer. The transparent electrode may be a light-transmitting, conductive oxide layer.

The V-shaped distortion structure may be formed in succession in at least one of the n-type semiconductor layer, the active layer and the p-type semiconductor layer. The V-shaped distortion structure may be formed around a threading dislocation to increase the resistance of this region, thereby preventing current leakage caused by a threading dislocation and reducing damage caused by electrostatic discharge (ESD). Besides, the V-shaped distortion structure forms an uneven structure on a semiconductor surface to thereby achieve luminance enhancement.

That is, the lattice mismatch between the sapphire substrate and the GaN semiconductor formed on the sapphire substrate causes a threading dislocation. The threading dislocation leads to a leakage current due to the electric current concentration when static electricity is applied thereto. For this reason, various studies have been conducted to reduce the threading dislocation causing current leakage and thus to prevent the damage caused by ESD.

According to the present invention, the V-shaped distortion structure is arbitrarily formed around the threading dislocation to increase the resistance in this region with the threading dislocation. Accordingly, the current concentration in this region is prevented, and ESD resistance can also be enhanced. A layer with this V-shaped distortion structure may be formed at a low growth temperature of 600° C. to 900° C. or through chemical etching and regrowth. The finished blue LED chip may be have a thickness ranging from 50 μm to 400 μm by controlling the thickness of a substrate by polishing or etching.

The red phosphor used to output white light may include a nitride-based phosphor containing N, for example, CaAlSiN$_3$:Eu. Nitride-based red phosphors have better resistance to discoloration and environmental conditions, such as heat and moisture, than sulfide-based phosphors. Particularly, the red phosphor has high excitation efficiency in the dominant wavelength of the blue LED chip limited to the specific range of 430 nm to 465 nm in order to obtain high color reproducibility. Other nitride-based phosphors, such as Ca$_2$Si$_5$N$_8$:Eu, or sulfide-based phosphors, may be used as the red phosphor.

As for the green phosphor, a nitride-based phosphor such as β-SiAlON:Eu, or a silicate-based phosphor, such as (Ba$_x$, Sr$_y$,Mg$_z$)SiO$_4$:Eu$^{2+}$, F, Cl (0<x, y≦2, 0≦z≦2, 0 ppm≦F and Cl≦5000000 ppm), may be used. Both nitride-based and silicate-based phosphors have high excitation efficiency within the dominant wavelength range from 430 nm to 465 nm of the blue LED chip.

Preferably, the blue LED chip may have a full width at half maximum (FWHM) ranging from 10 nm to 50 nm, the green phosphor may have a full width at half maximum (FWHM) ranging from 30 nm to 150 nm, and the red phosphor may have a full width at half maximum (FWHM) ranging from 50 nm to 200 nm. As each light source has these FWHM ranges, white light with higher uniformity and quality of color is obtained. Particularly, by limiting the dominant wavelength and the FWHM of the blue LED chip to the range from 430 nm to 465 nm and the range from 10 nm to 50 nm, respectively, the efficiency of the red phosphor, formed of CaAlSiN$_3$:Eu, and the efficiency of the green phosphor, formed of, β-SiAlON:Eu-based or (Ba$_x$,Sr$_y$,Mg$_z$)SiO$_4$:Eu$^{2+}$, F, Cl (0<x, y≦2, 0≦z≦2, 0 ppm≦F and Cl≦5000000 ppm), can be significantly enhanced.

The blue LED chip may be replaced with an ultraviolet (UV) LED chip having a dominant wavelength ranging from 380 nm to 430 nm. In this case, to output white light, the phosphor 122 needs to include at least blue, green and red phosphors. The blue phosphor may be selected from the group consisting of (Ba, Sr, Ca)$_5$(PO$_4$)$_3$Cl:(Eu$^{2+}$, Mn$^{2+}$) and Y$_2$O$_3$:(Bi$^{3+}$, Eu$^{2+}$). The green and red phosphors may be selected from the group consisting of the YAG-based, TAG-based, silicate-based, sulfide-based and nitride-based phosphors.

A white LED used to output white light can be obtained without the use of a phosphor. For example, a first quantum well layer comprises a nitride of an InGaN and/or GaN, which emits blue light, and a second quantum well layer emitting light having a different wavelength from the blue light (for example, yellow light) is further provided on the top and/or bottom of the first quantum well layer, thereby manufacturing an LED chip emitting white light from the combination of these two colors of light. The quantum well layer may have a multi-quantum well structure. The first and second quantum well layers may be formed by controlling the In content in the InGaN forming the first and second well layers. If the first quantum well layer emits light in the ultraviolet (UV) range from 380 nm to 430 nm, the amount of In the active layer may be controlled such that the second quantum well layer emits blue light and a third quantum well layer emits yellow light.

The recess 518 is formed by recessing the upper surface of each of the electrode structures 512 and 513 exposed to the bottom surface of the cavity 517 to a predetermined depth.

The recess 518 comprises a bent portion that is bent downward at one end of the electrode structure 512 within which at least one light emitting diode chip 511 is mounted. The bent portion includes a flat mounting surface and left and right lower inclined surfaces 512a and 513a. The flat mounting surface has the light emitting diode chip 511 mounted thereon. The left and right lower inclined surfaces 512a and 513a extend upward from the mounting surface toward the left and right, are inclined at predetermined angles, and face the outside of the light emitting diode chip 511.

Reflective members may be provided to the lower inclined surfaces 512a and 513a to reflect light emitted by the light emitting diode chip 511.

A depth (H) of each of the recesses 518 and 518a is within the range from 50 μm to 400 μm in consideration of a height (h) of the light emitting diode chip 511 that is mounted within the recess. This reduces the height of the cavity of the package body to a thickness within the range from the 150 μm to 500 μm. Therefore, the amount of light-transmissive transparent resins to be injected into the cavity 517 is reduced to thereby reduce manufacturing costs, increase luminance and reduce a product's size.

Preferably, lower inclined surfaces 512b and 513b having reflective members so as to reflect light generated by the light emitting diode chip 511, may be provided on ends of the electrode structures 512 and 513 facing the outside of the light emitting diode chip 511 mounted within the recess 518a.

In an LED package 500 having this configuration, the light emitting diode chip 511, located at the very center of the cavity 517, is mounted on the mounting surface of the bent portion, formed by bending the electrode structure 512 downward, or is mounted within the recess 518a recessed between the ends of the electrode structures 512 and 513 that face each other. Therefore, the upper surface of the light emitting diode chip 511 connected to the electrode structures 512 and 513 by wire bonding using the wires 514a and 514b is approximately at the same height as the upper surface of each of the electrode structures 512 and 513.

In this case, the maximum height of the wires 514a and 514b used for the wire bonding of the light emitting diode chip 511 can be reduced as much as the mounted height of the upper surface of the light emitting diode chip 511 is reduced.

In this manner, the amount of the light-transmissive, transparent resin 516 to be injected into the cavity 517 in order to protect the light emitting diode chip 511 and the wires 514a and 514b can be reduced. The height of the transmissive resin can also be reduced as much as the mounting height of the light emitting diode chip 511 is reduced. Accordingly, the luminance of light generated when the light emitting diode chip 511 emits light can be relatively increased in comparison to the related art.

As the height (H) of the light-transmissive, transparent resin 516 to be injected into the cavity 517 is reduced, the height of the package body 515 is reduced as much as the height (H) is reduced, thereby reducing the entire size of the package.

Figure 11A:
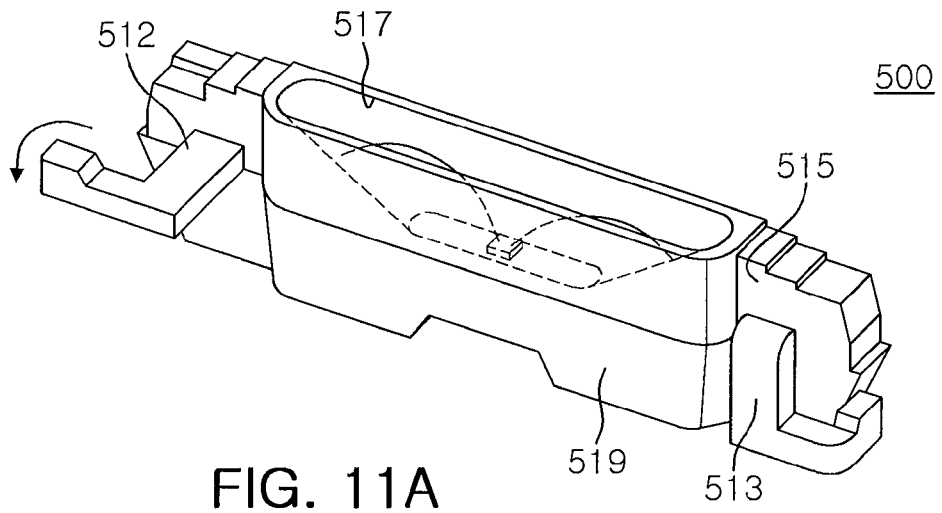
FIGS. 11A through 11C are schematic views illustrating a process of forming an external lead frame in an LED package according to an exemplary embodiment of the invention.
Figure 11B:
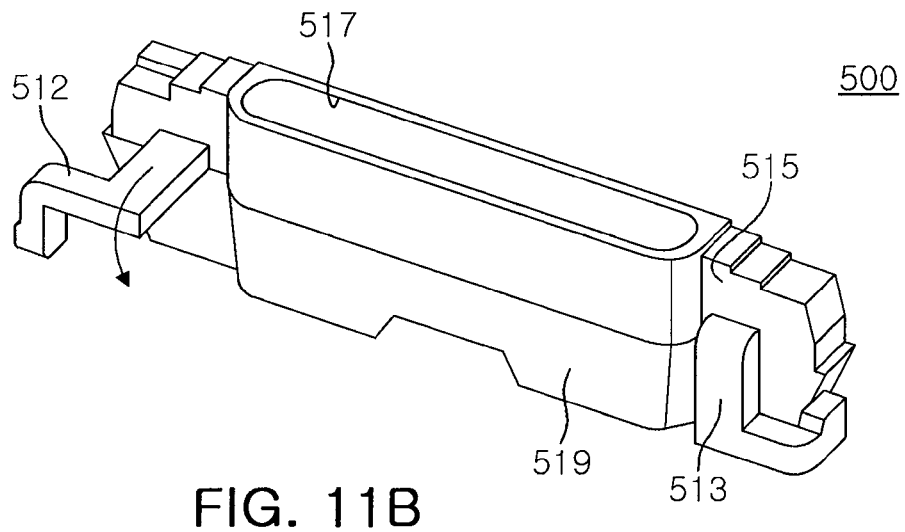
Figure 11C:
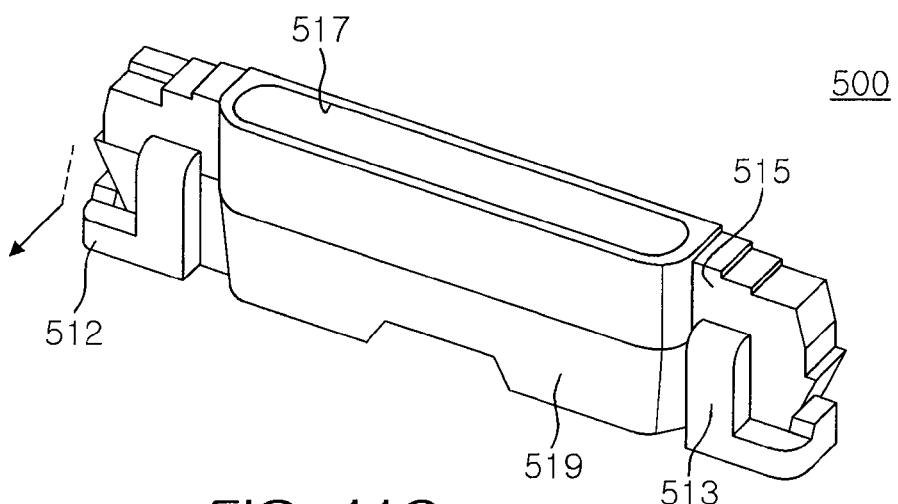

FIGS. 11A through 11C are schematic views illustrating a process of forming external lead frames in an LED package according to an exemplary embodiment of the invention.

As shown in FIG. 11A, most of the cathode and anode electrode structures 512 and 513 are integrally secured to the package body 515 manufactured by injection molding using resin materials, while the ends thereof are exposed to the outside of the package body 515 so that the electrode structures 512 and 513 can be connected with an external power supply.

The electrode structures 512 and 513 that are exposed to the outside of the package body 515 are bent in a direction opposite to a light emitting surface having the cavity 517 formed by bending the side and/or bottom of the LED package 515.

The electrode structures 512 and 513, exposed downward to the outside of the LED package 500, are bent toward the side and/or rear (backward or downward) of the LED package 500.

Figure 1:
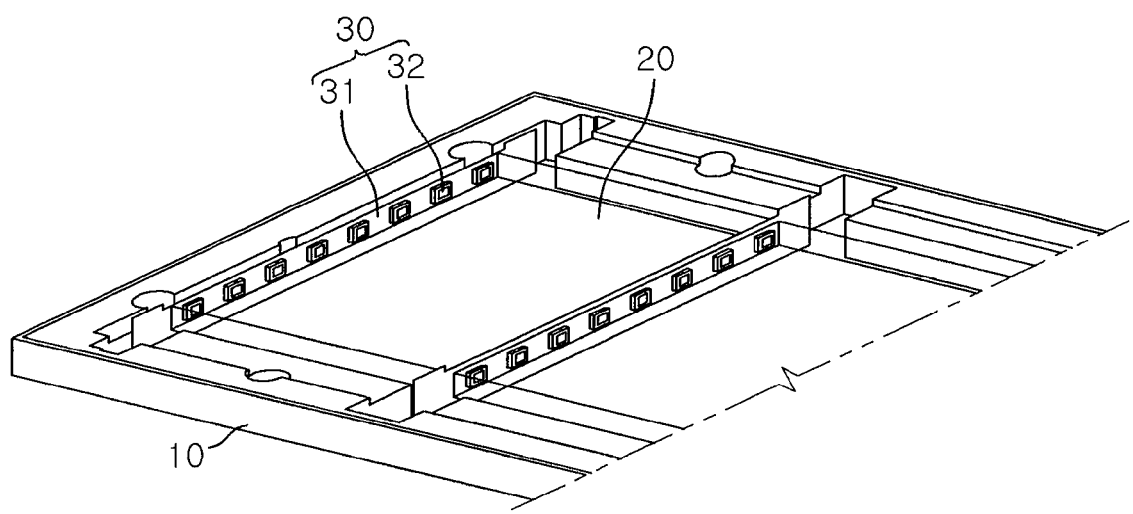
FIG. 1 is a partial perspective view illustrating a configuration of an edge-type local dimming backlight unit according to the related art.

First, as shown in FIG. 11B, the end of the electrode structure 512, exposed to the bottom surface of the LED package 512, is bent. Then, as shown in FIG. 1C, the electrode structure 512 having the bent end is bent in an opposite direction relative to the bottom surface 519, thereby completing the entire electrode structure 512.

As set forth above, according to exemplary embodiments of the invention, when an LED backlight unit includes divided light guide plates, and a liquid crystal display includes the LED backlight unit, definite fixation structures for the light guide plates are provided when assembling the light guide plates, in consideration of expansion and/or contraction of the light guide plates and the movements of the light guide plates in the case of external shocks.

While the present invention has been shown and described in connection with the exemplary embodiments, it will be apparent to those skilled in the art that modifications and variations can be made without departing from the spirit and scope of the invention as defined by the appended claims.

What is claimed is:
1. An LED backlight unit comprising:
a lower cover having a plurality of first through holes therein;
a plurality of light guide plates provided on the lower cover, the plurality of light guide plates being arranged in parallel with each other;
a plurality of boards provided on the lower cover and having a plurality of second through holes facing the first through holes of the lower cover, respectively, each of the boards being disposed on a side of each of the light guide plates;
a plurality of LED packages mounted onto the plurality of boards and supplying light through the side of each of the light guide plates; and
a plurality of fixation units engaged with the second through holes of the board and the first through holes of the lower cover so that the plurality of light guide plates are pressed against the lower cover.

2. The LED backlight unit of claim 1, wherein the fixation units comprises a head in contact with one edge of the light guide plate, and a body extending from the head and inserted into the through hole of the board.

3. The LED backlight unit of claim 1, wherein the fixation unit comprises a screw structure formed of a transparent material.

4. The LED backlight unit of claim 1, wherein the fixation unit is formed of the same material as the light guide plate.

5. The LED backlight unit of claim 1, wherein the first through hole of the lower cover is a groove or a through hole.

6. The LED backlight unit of claim 5, wherein the first through hole of the second lower cover and the through hole of the board have a longitudinal width, and the first through hole of the lower cover and the second through hole of the board each having the longitudinal width cross each other.

7. A liquid crystal display comprising:
a lower cover having a plurality of first through holes therein;
a plurality of light guide plates provided on the lower cover, the plurality of light guide plates being arranged in parallel with each other;
a plurality of boards provided on the lower cover and having a plurality of second through holes facing the first through holes of the lower cover, respectively, each of the boards being disposed on a side of each of the light guide plates;
a plurality of LED packages mounted onto the plurality of boards and supplying light through the side of each of the light guide plates;
a plurality of fixation units engaged with the second through holes of the board and the first through holes of the lower cover and pressing the plurality of light guide plates against the lower cover; and
a liquid crystal panel arranged above the plurality of light guide plate and receiving light from the LED packages.

8. The liquid crystal display of claim 7, wherein the fixation unit comprises a head in contact with one edge of the light guide plate, and a body extending from the head and inserted into the through hole of the board.

9. The liquid crystal display of claim 7, wherein the fixation unit comprises a screw structure formed of a transparent material.

10. The liquid crystal display of claim 7, wherein the fixation unit is formed of the same material as the light guide plate.

11. The liquid crystal display of claim 7, wherein the first through hole of the lower cover is a groove or a through hole.

12. The liquid crystal display of claim 11, wherein the first through hole of the lower cover and the second through hole of the board have a longitudinal width, and
the first through hole of the lower cover and the second through hole of the board each having the longitudinal width cross each other.

13. A LED backlight unit comprising:
a lower cover having a plurality of mounting portions formed therein;
a plurality of light guide plates provided on the lower cover, the plurality of light guide plates being arranged in parallel with each other, and each of the light guide plates having a plurality of through holes corresponding to the mounting portions, respectively;
a plurality of light source devices arranged on one side of each of the light guide plates and applying light to the light guide plates; and
a plurality of fixation units securing the light guide plates to the lower cover and restricting an undesirable movement of the light guide plates.

14. The LED backlight unit of claim 13, wherein the plurality of fixation units being inserted into the through holes of the light guide plates and the mounting portions of the lower cover, and engaged with the mounting portions of the lower cover.

15. The LED backlight unit of claim 13, wherein the plurality of light source devices include a plurality of LED packages generating light and a plurality of boards having circuit patterns to apply a driving voltage to the LED packages.

16. The LED backlight unit 13, wherein the fixation unit includes a head and a body extending from the head,
wherein the body passes through the through hole of the light guide plate, engages with the mounting portion and joins the light guide plate and the lower cover together.

17. The LED backlight unit of claim 16, wherein the head has a semi-circular, semi-elliptical, rectangular or triangular cross-sectional shape.

18. The LED backlight unit of claim 13, wherein the fixation unit comprises a screw structure formed of a transparent material.

19. The LED backlight unit of claim 13, further comprising a plurality of reflective member disposed under each of the light guide plates, the reflective member including openings corresponding to the through holes and the mounting portions.

* * * * *